(12) United States Patent
Li et al.

(10) Patent No.: US 11,596,097 B2
(45) Date of Patent: Mar. 7, 2023

(54) CULTIVATION METHOD BASED ON OPTIMIZATION OF PLANT NITROGEN FERTILIZER DISCLOSURE AMOUNT

(71) Applicant: GUANGXI ACADEMY OF AGRICULTURAL SCIENCES, Nanning (CN)

(72) Inventors: Changning Li, Nanning (CN); Qian Nong, Nanning (CN); Li Lin, Nanning (CN); Jinlan Xie, Nanning (CN); Zhanghong Mo, Nanning (CN)

(73) Assignee: GUANGXI ACADEMY OF AGRICULTURAL SCIENCES, Nanning (CN)

( * ) Notice: Subject to any disclaimer, the term of this patent is extended or adjusted under 35 U.S.C. 154(b) by 0 days.

(21) Appl. No.: 17/861,487

(22) Filed: Jul. 11, 2022

(65) Prior Publication Data

US 2023/0009752 A1  Jan. 12, 2023

Related U.S. Application Data

(63) Continuation of application No. PCT/CN2021/141510, filed on Dec. 27, 2021.

(30) Foreign Application Priority Data

Jul. 9, 2021 (CN) .......................... 202110775825.0

(51) Int. Cl.
  *A01C 21/00* (2006.01)
(52) U.S. Cl.
  CPC ................... *A01C 21/005* (2013.01)

(58) Field of Classification Search
  CPC ........................... A01C 21/005; A01C 21/00
  See application file for complete search history.

(56) References Cited

U.S. PATENT DOCUMENTS

2020/0337214 A1* 10/2020 Green .................. G06Q 90/00

FOREIGN PATENT DOCUMENTS

| CN | 104620959 A | * | 5/2015 | ............. A01G 31/00 |
| CN | 106993418 A | * | 8/2017 | ............. A01C 21/00 |
| CN | 110313299 A | * | 10/2019 | ............. A01C 21/00 |
| GB | 2570014 A | * | 7/2019 | ............. A01C 1/044 |

* cited by examiner

*Primary Examiner* — Christopher J. Novosad
(74) *Attorney, Agent, or Firm* — WPAT, PC

(57) ABSTRACT

A cultivation method based on an optimization of a plant nitrogen fertilizer disclosure amount includes: selecting plants to be planted in this batch, recording a number of the plants planted this time, and preparing different parts of nitrogen fertilizer for individual plants, each part of the nitrogen fertilizer being 10 g; and planting the same batch of plants every Monday with an interval of one week and fertilizing the planted plants in the second week after planting. According to the cultivation method based on the optimization of the plant nitrogen fertilizer disclosure amount, by adopting a mode of more tests and less planting, consumed plant seedlings are correspondingly reduced when a worker calculates an optimal fertilizer disclosure amount, thus effectively avoiding excessive waste, making a cost of a subsequent use cheaper, bringing a help to a whole experiment, and enabling people to use the method more conveniently.

3 Claims, 1 Drawing Sheet

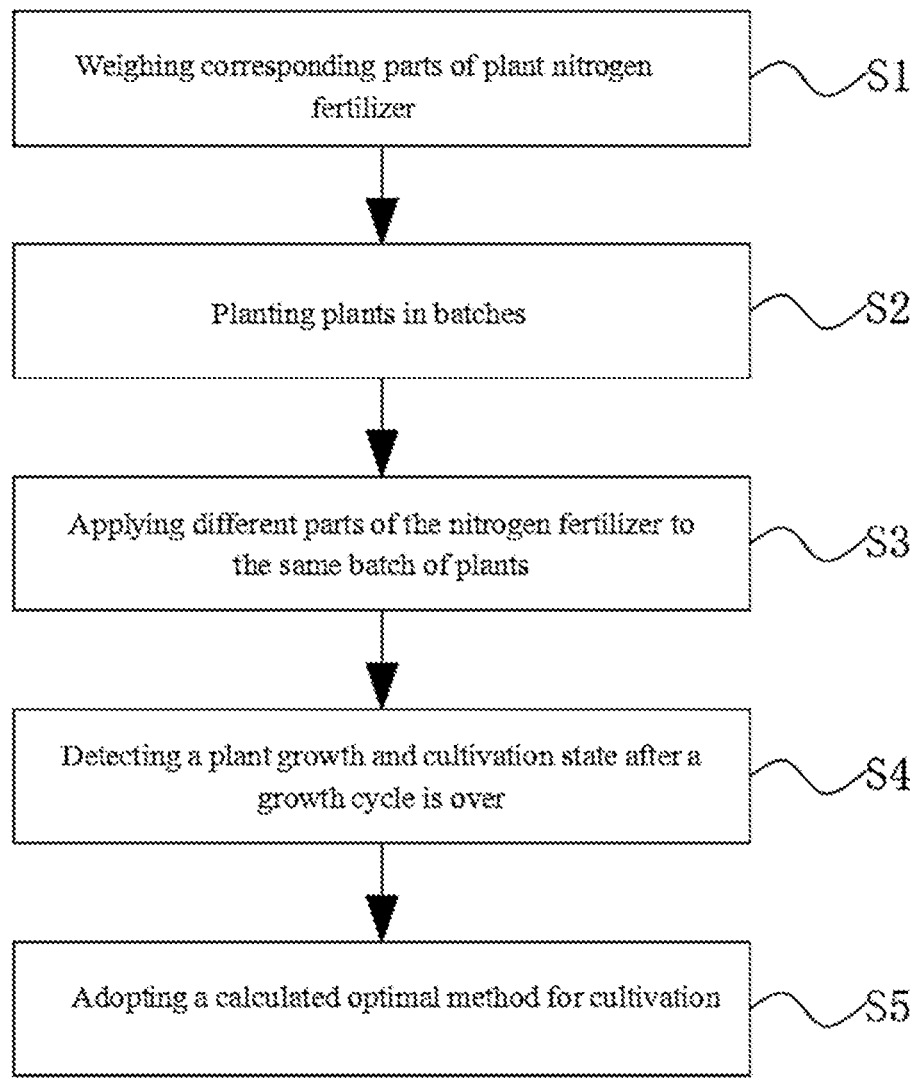

CULTIVATION METHOD BASED ON OPTIMIZATION OF PLANT NITROGEN FERTILIZER DISCLOSURE AMOUNT

CROSS-REFERENCE TO RELATED DISCLOSURE

This disclosure claims priority to Chinese Patent Disclosure No. 202110775825.0, filed on Jul. 9, 2021, the contents of which are hereby incorporated by reference.

TECHNICAL FIELD

The disclosure relates to the field of plant planting optimization technologies, and in particular to a cultivation method based on an optimization of a plant nitrogen fertilizer disclosure amount.

BACKGROUND

Nitrogen fertilizer takes nitrogen (N) as a main component, has a marked amount of N, and is applied to soil to provide plants nitrogen nutrition. The nitrogen fertilizer is a fertilizer variety with the largest amount of chemical fertilizer production and use in the world. The appropriate amount of the nitrogen fertilizer plays an important role in increasing crop yield and improving a quality of agricultural products. The nitrogen fertilizer is divided into ammonia nitrogen fertilizer, ammonium nitrogen fertilizer, nitrate nitrogen fertilizer, ammonium and nitrate nitrogen fertilizer, cyanamide nitrogen fertilizer and amide nitrogen fertilizer according to nitrogen-containing groups. A main raw material of chemical nitrogen fertilizer production is synthetic ammonia. From 1940s to 1950s, ammonium sulfate was the most important nitrogen fertilizer variety. In 1960s, ammonium nitrate was added. Since 1970s, urea has become the dominant nitrogen fertilizer variety, and ammonium bicarbonate was one of the main nitrogen fertilizer varieties produced in China in 1980s.

The existing cultivation method of plant nitrogen fertilizer is too complicated, and a calculating duration is too long, and the existing method does not have a function of timely adjustment. When some large-scale plants are planted, many plants and seedlings are wasted to clearly calculate the best planting mode, resulting in excessive waste. Therefore, the existing cultivation method is inconvenient for people to use and brings troubles to people.

SUMMARY

(1) Technical Problems to be Solved

Aiming at the shortcomings of the prior art, the disclosure provides a cultivation method based on an optimization of a plant nitrogen fertilizer disclosure amount, so as to solve the problems raised in the background art.

(2) Technical Scheme

In order to achieve above objective, the disclosure is realized by the following technical scheme: a cultivation method based on an optimization of a plant nitrogen fertilizer disclosure amount specifically includes following steps:

S1, selecting a batch of plants to be planted, recording a number of the plants planted this time, and preparing different parts of nitrogen fertilizer for individual plants, each of the parts of the nitrogen fertilizer being 10 g;

S2, planting the same batch of plants every Monday (i.e., target day) with an interval of one week, and fertilizing the planted plants in the second week after planting;

S3, planting the same batch of plants with 20 plants as a group and a batch of 5 groups; gradually increasing the fertilizer disclosure amount, applying one part of the nitrogen fertilizer to a first group, two parts to a second group, three parts to a third group, four parts to a fourth group and five parts to a fifth group, and marking these groups;

S4, after a four-week growth cycle of the planted plants is over, inspecting a first batch of plants to detect best growth conditions (i.e., first growth conditions), and applying the conditions to a fifth batch that needs fertilization at this time; and after a second batch of plants reaches the growth cycle, applying the best growth conditions of the second batch (i.e., second growth conditions) to a sixth batch that needs fertilization, and so on; and S5, taking one quarter as a whole test cycle; after the whole quarter is over, selecting all test results, among which the group with most repeated times is the best growth mode (i.e., target growth mode); recording the mode, and then applying the mode to the planting.

In an embodiment, planting conditions of all the groups and the batches in S3-S4 are the same, and the planting conditions are 25-30° C.

In an embodiment, the planting and watering of all the groups and the batches in S3-S4 are between 7:00 and 8:00 in mornings, and the amount of watering each time is 300 ml per plant.

(3) Beneficial Effects

The disclosure provides a cultivation method based on an optimization of a plant nitrogen fertilizer disclosure amount. The cultivation method based on the optimization of the plant nitrogen fertilizer disclosure amount has beneficial effects that, by adopting the mode of more tests and less planting, consumed plant seedlings are correspondingly reduced when a worker calculates an optimal fertilizer disclosure amount, thus effectively avoiding excessive waste, making a cost of a subsequent use cheaper, bringing a help to a whole experiment, enabling people to use the method more conveniently. Therefore, the method is beneficial to people's use.

BRIEF DESCRIPTION OF THE FIGURE

The FIGURE is a flowchart of a working principle of the disclosure.

DETAILED DESCRIPTION OF THE EMBODIMENTS

Technical schemes in embodiments of the disclosure will be clearly and completely described below with reference to drawings in the embodiments of the disclosure. Obviously, the described embodiments are only part of the embodiments of the disclosure, but not all of them. Based on the embodiments of the disclosure, all other embodiments obtained by ordinary technicians in the field without creative labor are within a scope of the disclosure.

With reference to FIG. 1, the embodiment of the disclosure provides a technical scheme: a cultivation method based on an optimization of a plant nitrogen fertilizer disclosure amount, which specifically includes following steps S1 to S5.

In the step S1, selecting a batch of plants to be planted, recording a number of the plants planted this time, and preparing different parts of nitrogen fertilizer for individual plants, each of the parts of the nitrogen fertilizer being 10 g.

In the step S2, planting the same batch of plants every Monday with an interval of one week, and fertilizing the planted plants in the second week after planting.

In the step S3, planting the same batch of plants with 20 plants as a group and a batch of 5 groups; gradually increasing the fertilizer disclosure amount, applying one part of the nitrogen fertilizer to a first group, two parts to a second group, three parts to a third group, four parts to a fourth group and five parts to a fifth group, and marking these groups.

In the step S4, after a four-week growth cycle of the planted plants is over, inspecting a first batch of plants to detect best growth conditions, and applying the conditions to a fifth batch that needs fertilization at this time; and after a second batch of plants reaches the growth cycle, applying the best growth conditions of the second batch to a sixth batch that needs fertilization, and so on.

In the step S5, taking one quarter as a whole test cycle; after the whole quarter is over, selecting all test results, among which the group with most repeated times is the best growth mode; recording the mode, and then applying the mode to the planting.

In an embodiment, planting conditions of all the groups and the batches in S3-S4 are the same, and the planting conditions are 25-30° C.

In an embodiment, the planting and watering of all the groups and the batches in S3-S4 are between 7:00 and 8:00 in mornings, and amount of watering each time is 300 ml per plant.

Nitrogen fertilizer contains a large amount of nitrogen. Moreover, nitrogen is a component of amino acids in plants and a component of protein, and nitrogen is conducive to enhancing photosynthesis. Nitrogen fertilizer promotes divisions and growths of crop cells, promotes the growths of crops, increases crop yield and improves a quality of agricultural products. Nitrogen fertilizer can increase the content of protein in plant seeds, thus improving a nutritional value of products.

It should be noted that in this text, relational terms such as first and second are only used to distinguish one entity or operation from another entity or operation, and do not necessarily require or imply any such actual relationship or sequence between these entities or operations. Moreover, the terms "comprising", "including" or any other variation thereof are intended to cover non-exclusive inclusion, so that a process, method, article or equipment that includes a series of elements not only includes those elements, but also includes other elements not explicitly listed, or also includes elements inherent to such process, method, article or equipment without more restrictions.

Although the embodiments of the disclosure have been shown and described, it will be understood by those skilled in art that many changes, modifications, substitutions and variations can be made to these embodiments without departing from a principle and a spirit of the disclosure, and the scope of the disclosure is defined by appended claims and their equivalents.

What is claimed is:

1. A cultivation method based on an optimization of a plant nitrogen fertilizer disclosure amount, comprising:
    S1, selecting a batch of plants to be planted, recording a number of the plants, and preparing different parts of nitrogen fertilizer for individual plants, each of the parts of the nitrogen fertilizer being 10 g;
    S2, planting a same batch of plants every target day with an interval of one week, and fertilizing the planted plants in a second week after the planting;
    S3, planting the same batch of plants with 20 plants as a group and a batch of five groups;
    gradually increasing a fertilizer application amount, applying one part of the nitrogen fertilizer to a first group in the five groups, two parts to a second group in the five groups, three parts to a third group in the five groups, four parts to a fourth group in the five groups, and five parts to a fifth group in the five groups, and marking the five groups;
    S4, after a four-week growth cycle of a first batch of plants is over, inspecting the first batch of plants to detect first growth conditions, and applying the first growth conditions to a fifth batch of plants to be fertilized; and after a four-week growth cycle of a second batch of plants is over, inspecting the second batch of plants to detect second growth conditions, applying the second growth conditions to a sixth batch of plants to be fertilized; and
    S5, taking one quarter as a test cycle, and selecting test results after the one quarter is over to take a group with most repeated times as a target growth mode, recording the target growth mode, and then applying the target growth mode to planting.

2. The cultivation method based on an optimization of a plant nitrogen fertilizer disclosure amount according to claim 1, wherein planting conditions of the groups and batches are same, and each of the planting conditions includes a temperature of 25-30° C.

3. The cultivation method based on an optimization of a plant nitrogen fertilizer disclosure amount according to claim 1, wherein the planting and watering of the groups and batches are carried out between 7:00 and 8:00 in mornings, and an amount of the watering each time is 300 ml per plant.

* * * * *